United States Patent
Soon

[19]

[11] Patent Number: 5,980,099
[45] Date of Patent: Nov. 9, 1999

[54] APPARATUS FOR STIRRING WITH AUTOMATIC SHAFT COUPLING MECHANISM

[75] Inventor: Tan Khee Soon, Singapore, Singapore

[73] Assignee: Cluster Technologies Pte Ltd., Singapore, Singapore

[21] Appl. No.: 09/104,256

[22] Filed: Jun. 24, 1998

[30] Foreign Application Priority Data

Feb. 12, 1998 [SG] Singapore ............................ 9800319-7

[51] Int. Cl.$^6$ ..................................................... B01F 7/20
[52] U.S. Cl. .......................... 366/204; 366/249; 366/331; 99/348; 403/322.1
[58] Field of Search ............................ 366/64–66, 96–98, 366/100, 204, 102–104, 242–251, 314, 331; 99/348; 464/182; 403/322.1, 324, 325, 359

[56] References Cited

U.S. PATENT DOCUMENTS

| | | | |
|---|---|---|---|
| 360,485 | 4/1887 | Smith . | |
| 682,292 | 9/1901 | Sukalle | 366/331 |
| 2,203,664 | 6/1940 | Benson | 366/331 |
| 5,013,158 | 5/1991 | Tarlow | 366/251 |
| 5,201,263 | 4/1993 | Teng | 366/249 |
| 5,516,208 | 5/1996 | Givant | 366/251 |

*Primary Examiner*—Charles E. Cooley
*Attorney, Agent, or Firm*—Lawrence Y.D. Ho; David D. Chung; Jacqueline C.T. Lui

[57] ABSTRACT

An apparatus for stirring which allows automatic coupling of the motor assembly with the stirring shaft. The apparatus comprises a housing, a detachable stirring shaft with an engagement head, and a motor assembly. The motor assembly is fixed onto the housing, and includes a cam assembly having a coupling shaft coupled to a cam device. The cam assembly is adapted to provide an engagement position and a disengagement position of the coupling shaft. The engagement position allows the coupling shaft to engage the stirring shaft when the stirring shaft is placed in a receiving position. A set of gears allows the translation of rotary movement of a motor into the rotating action of the coupling shaft.

13 Claims, 4 Drawing Sheets

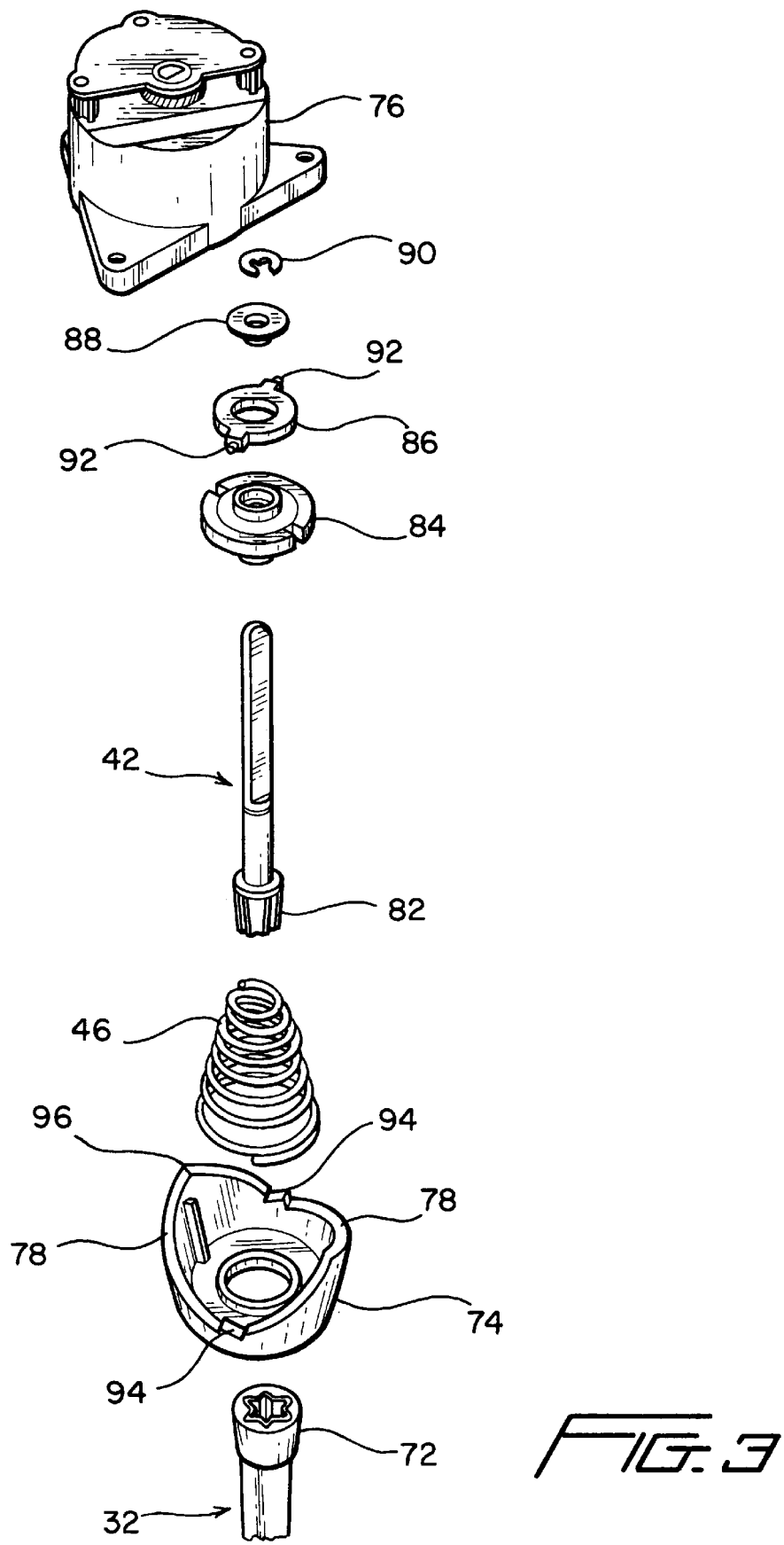

APPARATUS FOR STIRRING WITH AUTOMATIC SHAFT COUPLING MECHANISM

FIELD OF THE INVENTION

The present invention is related to mechanical stirring or cutting devices. In particular, the present invention is related to a stirring or cutting device in household appliances such as food processors.

BACKGROUND OF THE INVENTION

Household appliances such as mixers, blenders and food processors typically comprise a housing, a stirring shaft and a mixing bowl. The housing usually includes a head, a stem and a base. Generally, the stirring mechanisms can be divided into two types, The first type is the top-mixing type, which has the motor and coupling mechanism within the head of the housing of the appliance, such as in bench-top cake mixers. Typically, the head is rotatable, such that one or two stirring shafts have to be manually attached to the coupling mechanism, followed by the placement of the mixing bowl on the base of the housing. The head of the housing is then rotated such that the stirring shaft is rotated into the mixing bowl and points towards the bottom of the mixing bowl. In a variation of this top-mixing design, the head is not rotatable, and the shaft has to be attached manually by the operator having access between the mixing bowl and the head of the housing. This non-rotatable design is often found in industrial scale mixers, which have housing heads containing motors which are too large, heavy or bulky to be conveniently rotated. The advantage of having a top-mixing design is that the base of the housing can contain additional useful function, such as heating or rotating elements. The disadvantage of this design is that a relatively large space must be left between the mouth of the mixing bowl and the head of the housing. In the rotatable head design, this is necessary to give sufficient room for the shaft to be lowered down into the bowl after being attached. In the non-rotatable design, this space is necessary for the operator to access the coupling point with the stirring shaft inside the bowl. As a result, the mixing bowls are often wide and shallow, and cannot be provided with a lid. Because of the need for this space, this top-mixing design is rarely used for high speed mixing of fluids, such as fruit juices or milkshake, since the content may spill easily. In addition, although the base allows for an additional heating element, this is often not included since the hot liquid may also easily spill out from the space present.

In the second type of mixers, such as food blenders, the stirring mechanism is located at the base of the housing. The stirring or cutting blades are typically found coupled to the motor at the bottom of the mixing container. The motor coupled to a coupler is fixed to the base, and upon the proper placement of the container, the stirring blade would be securely coupled to the coupler. This base-mixing design allows the high speed mixing of liquids without the danger of spillage, as the container is usually provided with a lid, However, if heating is required, the heating element would have to be provided from the top, for example, in the form of a heating rod attached to the lid of the container. Such a design is undesirable, because electrical wiring has to be wired to the lid, making the manipulation of the lid both dangerous and cumbersome. In addition, a long heating rod which needs to be removed every time the container is filled and emptied results in great inconvenience and safety hazards.

OBJECT OF THE INVENTION

It is therefore an object of the present invention to provide an apparatus to overcome the shortcomings as stated above.

It is another object of the present invention to provide a stirring apparatus with an automatic stirring shaft coupling mechanism.

It is yet another object of the present invention to provide a stirring apparatus which can include a convenient and safe heating element design.

SUMMARY OF THE INVENTION

The present invention provides an apparatus for stirring which allows automatic coupling of the motor assembly with the stirring shaft. The apparatus comprises a housing, a detachable stirring shaft with an engagement head, a motor assembly and retaining means. The retaining means supports the stirring shaft in a receiving position. The motor assembly is fixed onto the housing, and includes a cam assembly having a coupling shaft coupled to a cam device. The cam assembly is adapted to provide an engagement position and a disengagement position of the coupling shaft. The engagement position allows the coupling shaft to engage the stirring shaft when the stirring shaft is placed in a receiving position. A set of gears allows the translation of rotary movement of a motor into the rotating action of the coupling shaft. In the preferred embodiment, a container is provided, and the retaining means is a retainer such as a detachable rack within the container. The rack holds the stirring shaft in a vertical position directly underneath the coupling shaft. A simple pressing motion on the cam assembly switches it into the engagement position, allowing the coupling shaft to extend downwards to engage the stirring shaft. As the entire coupling mechanism can be operated automatically at the pressing of the cam assembly, the container may be designed to fit snugly below the head of the housing. A lid may also be provided for the container, such that liquid may be stirred at high speed without spilling. In another embodiment, a heating plate is provided at the base of the housing for heating the liquid to be stirred.

BRIEF DESCRIPTION OF THE DRAWINGS

FIG. 3 is an exploded view of the cam assembly.

DESCRIPTION OF THE INVENTION

The present invention provides a stirring apparatus which achieves the advantages of both the top-mixing type apparatus and the base-mixing type apparatus. This apparatus allows for the automatic coupling of the motor assembly to the stirring shaft from a position above the container, thereby allowing additional functions to be added at the base of the housing, and at the same time provides for safe and protected stirring.

The key features of the present invention includes a motor assembly having a motor, a cam assembly with a coupling shaft. In the preferred embodiment, the cam assembly is housed inside the head of the housing of the apparatus above a stirring shaft, In the operating position, the stirring shaft is retained in a receiving position by a retainer, such that the coupling shaft may be lowered by the cam assembly onto the stirring shaft, engaging it securely. The following is the detailed description of the preferred specific embodiment.

Figure 1:
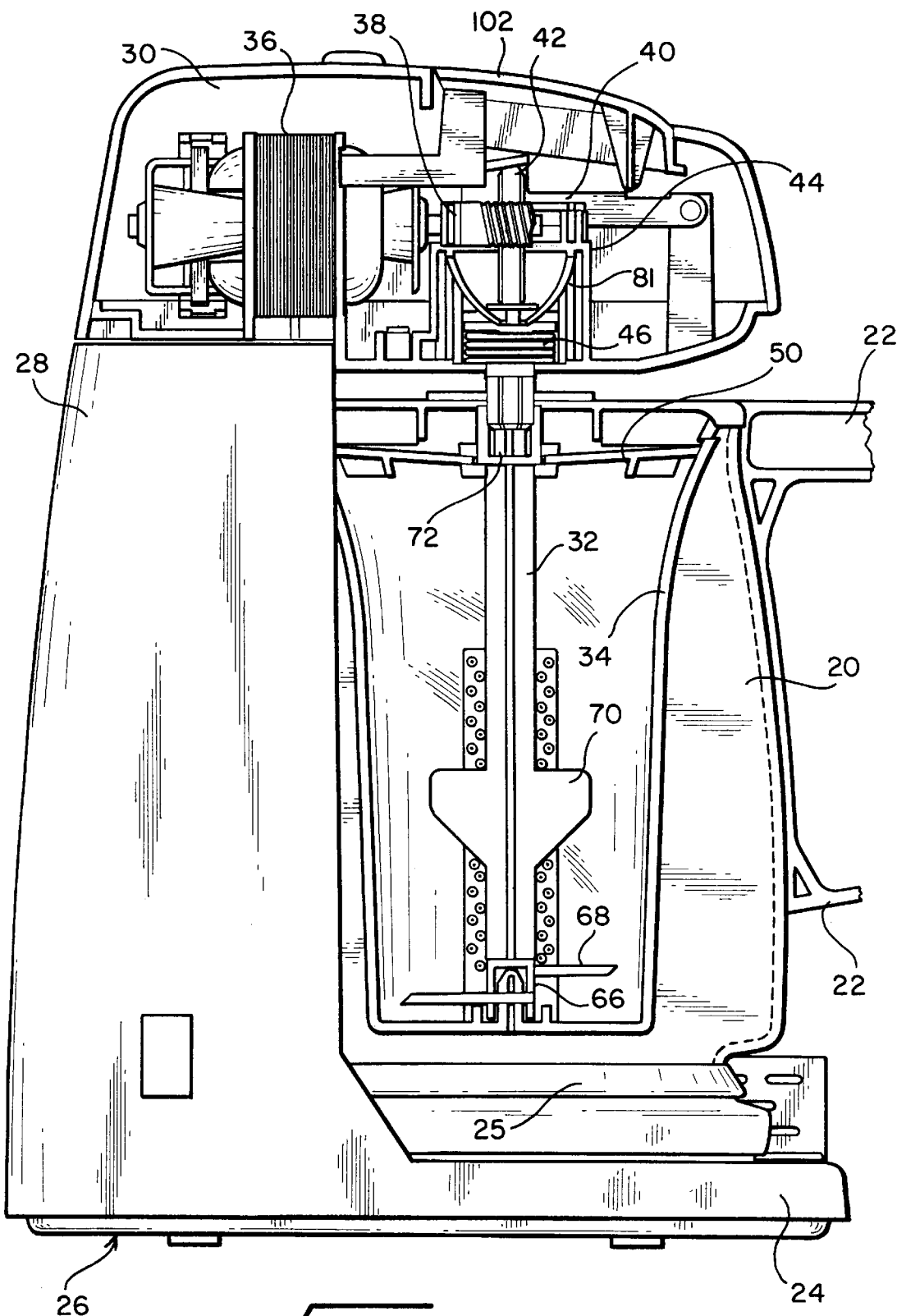
FIG. 1 side cross-sectional view of the specific preferred embodiment of the present invention.

FIG. 1 shows a side cross-sectional view of the specific embodiment of the present invention. In this embodiment, the apparatus is designed for the brewing of soybean milk. This process involves soaking soybean granules in hot water in a heat-resistant glass jug such as a Schott or Pyrex jug, followed by blending to elute out the soluble nutrients. The soybean granules are retained and blended in a sieve retainer, such that the insoluble residue would be retained inside the sieve. FIG. 1 shows a heat-resistant glass jug 20 with handle 22 (partially shown) being placed on the base 24 of the housing 26. The housing also has a stem 28 and a head 30. The base of the housing contains a heating plate 25. The retainer for supporting the stirring shaft 32 is supported in the sieve retainer 34 by the sieve lid 50. The motor assembly is fixed into the head 30 of the housing, and includes the motor 36 and gears 38 which are connected to a cam assembly 40. The cam assembly includes a coupling shaft 42, a cam device 44 and a spring coil 46. The stirring shaft has a cap 66, cutting blades 68, stirring blades 70 and an engagement head 72.

Figure 2:
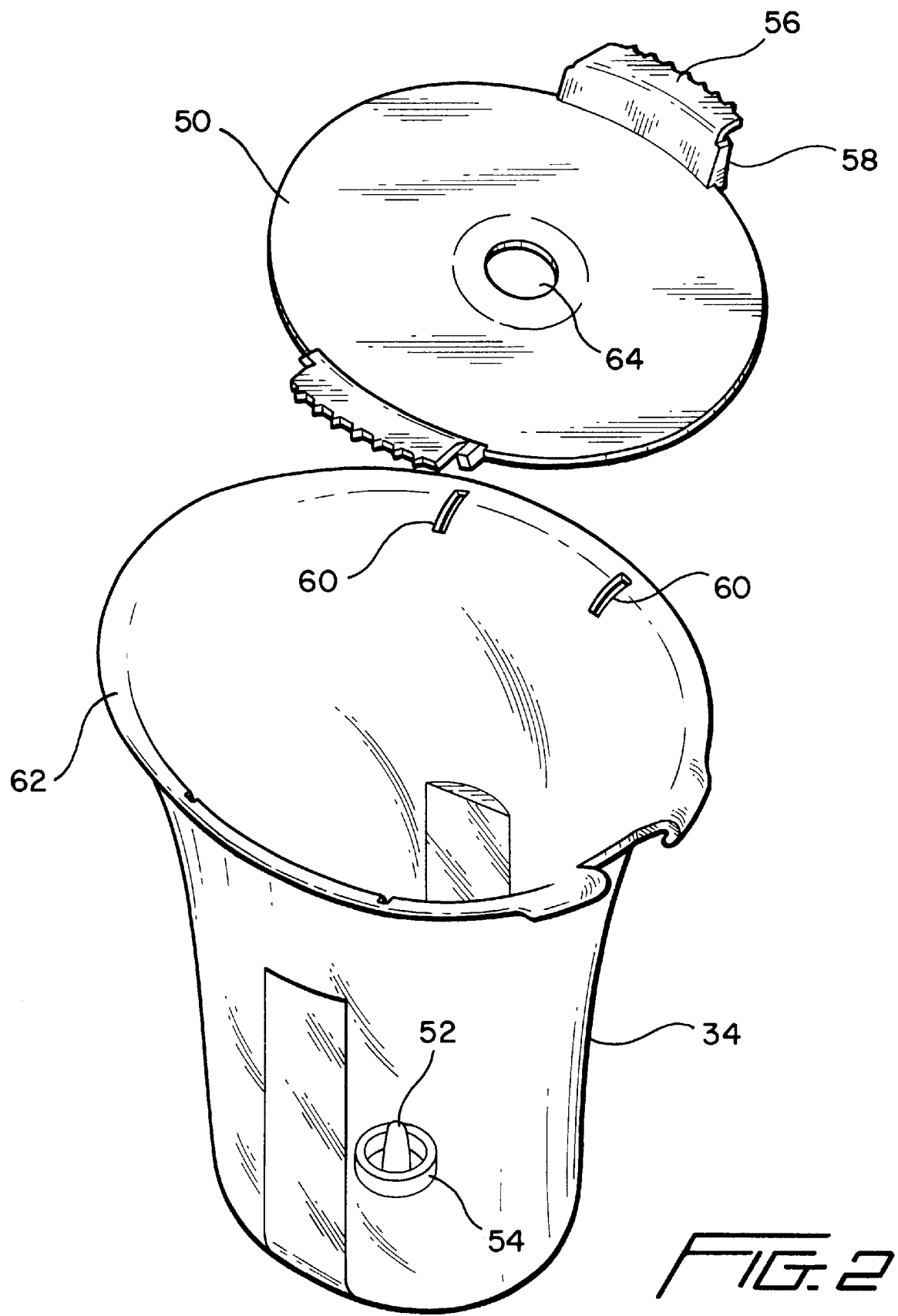
FIG. 2 is top three-quarter perspective view of the sieve retainer.

FIG. 2 shows the sieve retainer 34 in greater detail. It includes a lid 50 and a shaft stabilizer. The shaft stabilizer can be any structure which facilitates the positioning of the stirring shaft into a receiving position. In this embodiment, the shaft stabilizer has a pin 52 and a curb 54, The lid 50 has lugs 58 which fit into the slots 60 of the sieve retainer. These lugs 58 sit on either side of ledges 56. The sieve retainer also has a ledge 62 around the top such that the entire sieve retainer may hang inside the glass jug by this ledge. The cap 66 of the stirring shaft (shown in FIG. 1) is adapted to fit onto the pin 52 and curb 54 structure, and the stirring shaft is kept vertical by being retained within the hole 64 of the lid. It The lugs 58 ensures that the lid does not rotate when the stirring shaft is stirring.

Figure 4B:
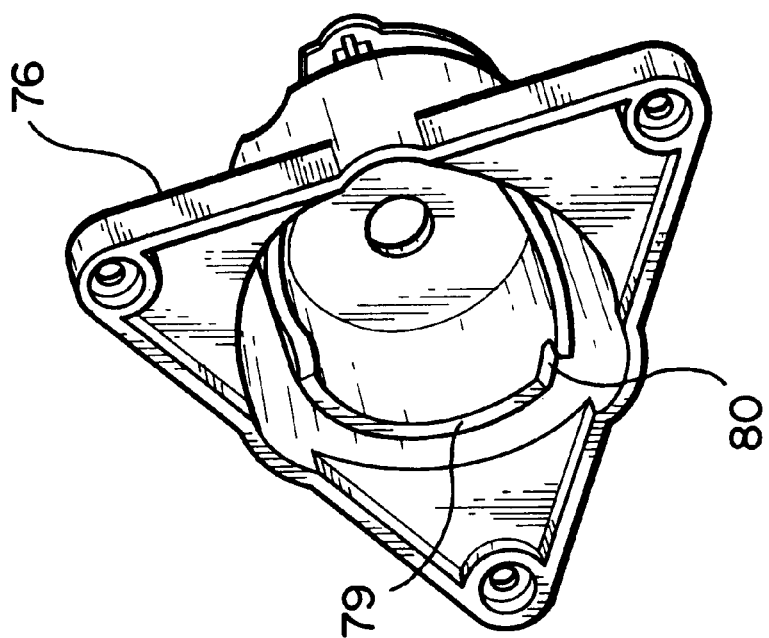
FIGS. 4A and B are the front and bottom perspective views respectively of the top half of the cam housing.

FIG. 3 is an exploded view of the cam assembly 40 which is enclosed within the cam housing. The bottom half 74 of the cam housing has two ridges 78 each with one set of opposing landings 94 at the bottom. These match the two ridges 79 and two opposing landings 80 (shown in FIG. 4B) of the top half 76. In a functioning position, the two halves are assembled together with a uniform gap (shown by reference numeral 81 in FIG. 1) between the ridges of the top and bottom halves. A spring coil 46 is provided within the bottom half and around the coupling shaft to bias the coupling shaft 42 upwards, The coupling shaft has a coupler 82 at one end, and is provided with a ring assembly to facilitate interaction with the cam housing. The ring assembly comprises four pieces, the bushing 84, the rotary disc 86, the washer 88 and the c-clip 90. The c-clip and the washer secures the rotary disc and the bushing onto the coupling shaft. The rotary disc and the bushing are free to rotate in relation to the coupling shaft. Two pins 92 extend from the rotary disc, and are adapted to slide within the gap 81 between the top and bottom halves of the cam housing. As the coupling shaft is pressed down by the operator, the ring assembly and the coupling shaft are moved downwards between the two ridges of the assembled cam housing. The two pins 92 on the rotary disc 86 are lodged in the lower landings 94 of the ridges, and hold the coupling shaft in this down position. In this position, the coupler 82 of the coupling shaft engages the stirring shaft 42 by its engagement head 72. The spring coil ensures that the external button is returned to its original position for subsequent activation. When the cam assembly is depressed again, the ring assembly and the coupling shaft are moved from the lower landings along the ridges to the top of the ridges 96. This is the disengage position, and the coupling shaft is withdrawn from the engagement head of the stirring shaft.

Figure 4A:
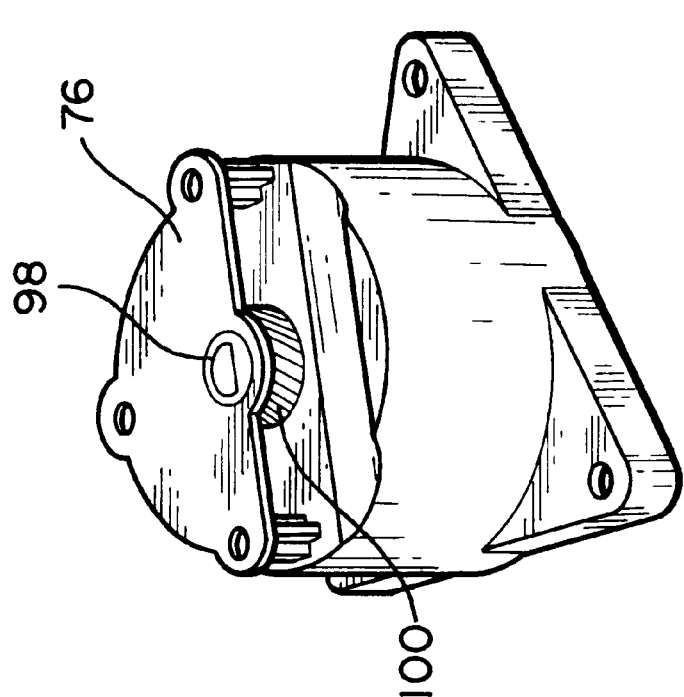

FIGS. 4A and B shows the top half of the cam housing. In the functioning position, the coupling shaft, which extends through hole 98, rotates by the translation of rotary motion from the motor's worm gear to the helical gear (partly shown in reference numeral 100 in FIG. 4A). The helical gear fits around the coupling shaft through its D shaped hole 98 which matches the D-shaped, bevel cut on the coupling shaft.

For the brewing of soybean milk, the operator prepares the apparatus for brewing by placing the sieve retainer into the glass jug and filling the glass jug with water. The stirring shaft is then lowered into the sieve retainer by engaging the cap of the stirring shaft over the shaft stabilizer of the sieve retainer. The soybean granules are then added and the lid secured. At this point, the stirring shaft is maintained automatically in the vertical position by the shaft stabilizer of the sieve retainer and the lid. The glass jug is then placed onto the heating plate of the housing. The operator then presses down on an external button (reference numeral 102 of FIG. 1) which sits directly over the coupling shaft. Pressing this external button results in the lowering of the coupling shaft to engage the engagement head of the stirring shaft. The cam assembly keeps the coupling shaft locked in this engagement position. The brewing process is then started by switching the POWER on, and then depressing the START BREW button. The heating plate then heats up the content of the glass jug. Stirring and cutting by the stirring shaft occurs according to the set program. A thermistor is provided in the stem for process and temperature control. When the entire process is completed, the operator can disengage the coupling shaft from the stirring shaft by simply depressing the external button of the cam assembly again.

While the present invention has been described particularly with references to FIGS. 1 to 4 with emphasis on an apparatus for brewing soybean milk, it should be understood that the figures are for illustration only and should not be taken as limitation on the invention. In addition it is clear that the method and apparatus of the present invention has utility in many applications where automatic shaft coupling is useful, e.g. for mixers, blenders and other type of food processors. It is contemplated that many changes and modifications may be made by one of ordinary skill in the art without departing from the spirit and the scope of the invention described.

In the example of the specific preferred embodiment, the retaining means is a sieve retainer with a lid which keeps the stirring shaft in a vertical position. Although a vertical position is the best mode of performing the present invention, it is contemplated that other angles are workable as long as the cam and motor assemblies are adapted for those angles. Although the shaft is shown with a linear rod with stirring blades and cutting blades in the preferred embodiment, other shapes such as a helical shape with a coupling end are possible depending on the function of the apparatus. Other retaining means which allows the stirring shaft to be maintained in a receiving position may be used instead of the sieve retainer, such as a retainer or a rack. The container has been described as a heat-resistant glass jug. Other containers, such as normal glass jugs, Pyrex containers or metallic containers may also be used, depending on the application. Although the retainer has been described as a separate entity in the specific preferred embodiment, it is contemplated that the bottom of the container may also be molded into a pin shape, such that the retaining means may be completely integrated into the container.

The cam assembly as described in the preferred embodiment may be replaced by other cam assembly within the knowledge of one of ordinary skill in the art. Although a heating plate is described in the above example, it is understood that this function is not required, or may be replaced by other functions, such as a rotating pad.

The invention claimed is:

1. An apparatus for stirring comprising:
a housing;
a detachable stirring shaft with an engagement head;
a motor assembly fixed onto the housing, said motor assembly having a cam assembly including a coupling shaft having a first end and a second end, said first end coupled to a cam device, said cam assembly adapted to provide an engagement position and a disengagement position for the coupling shaft, a motor coupled to gears, said gears adapted to translate the rotary action of the motor into a rotating action of the coupling shaft; and
retaining means coupled to said stirring shaft for supporting the stirring shaft such that the position of the engagement head coincides with the engagement position of the second end of the coupling shaft whereby activating the coupling shaft to the engagement position via the cam assembly causes locking of the coupling shaft onto the stirring shaft.

2. An apparatus for stirring comprising:
a housing having a head, a stem and a base;
a container for holding substances to be stirred, the container adapted for resting on the base of the housing;
a detachable stirring shaft with an engagement head for stirring within the container;
a motor assembly fixed onto the head of the housing, said motor assembly having
a cam assembly including a coupling shaft having a first end and a second end, said first end coupled to a cam device, said cam assembly adapted to provide an engagement position and a disengagement position for the coupling shaft,
a motor coupled to gears. said gears adapted to translate the rotary action of the motor into a rotating action of the coupling shaft;
retaining means coupled to said stirring shaft for supporting the stirring shaft below the cam assembly and in a receiving position such that the position of the engagement head coincides with the engagement position of the second end of the coupling shaft whereby activating the coupling shaft to the engagement position via the cam assembly causes locking of the coupling shaft onto the stirring shaft.

3. An apparatus for stirring according to claim 2 wherein the retaining means is a sieve retainer, the sieve retainer having a shaft stabilizer and securing means for securing the retainer onto the container.

4. An apparatus for stirring according to claim 3 wherein the shaft stabilizer includes a pin and a curb at the bottom of the sieve retainer.

5. An apparatus for stirring according to claim 3 wherein the sieve retainer further comprises a lid.

6. An apparatus for stirring according to claim 5 wherein the lid includes a hole wherethrough the stirring shaft extends.

7. An apparatus for stirring according to claim 5 wherein the lid includes at least one lug which fits into a corresponding slot in the sieve retainer for preventing rotary movement of the lid.

8. An apparatus for stirring according to claim 2 wherein the stirring shaft contains a stirring blade.

9. An apparatus for stirring according to claim 2 wherein the stirring shaft contains a cutting blade.

10. An apparatus for stirring according to claim 2 wherein the container is a heat-resistant jug.

11. An apparatus for stirring according to claim 2 wherein said cam device further comprises:
a cam housing having a top half fixed onto a bottom half, said top half including a coupling end coupled with said gears adapted to receive and engage said first end of said coupling shaft; a side wall extending from said coupling end, said side wall having a first pair of peaks and a first pair of landings; and said bottom half having an end plate with a hole and a second side wall having a second pair of peaks and a second pair of landings, said second end of said coupling shaft extending through said hole, said first pair of peaks and first pair of landings matching said second pair of peaks and second pair of landings respectively such that a gap of uniform distance is maintained therebetween;
a spring coil retained within said cam housing and engaging said coupling shaft for biasing the coupling shaft away from the bottom half of the cam housing; and
a ring assembly provided inside said cam housing including a rotary disc with two pins, said pins slidably inserted within said gap, said rotary disc adapted for controlling the axial movement of the coupling shaft, such that one downward press of the first end of the coupling shaft causes the two pins to slide within the gap and to lodge between the first and second pairs of landings, whereby said coupling shaft is locked into said engagement position, and a second press of the first end of the coupling shaft causes the two pins to disengage from between the first and second pairs of landings, and to slide up the gap to a position between the first and second peaks whereby said coupling shaft is locked into said disengagement position.

12. A method of food processing using an apparatus for stirring, said apparatus including:
a housing having a head, a stem and a base;
a container for holding substances to be stirred, the container adapted
for resting on the base of the housing;
a detachable stirring shaft with an engagement head for stirring within the container;
a motor assembly fixed onto the head of the housing, said motor assembly having
a cam assembly including a coupling shaft having a first end and a second end, said first end coupled to a cam device, said cam assembly adapted to provide an engagement position and a disengagement position for the coupling shaft,
a motor coupled to gears, said gears adapted for translating the rotary action of the motor into a rotating action of the coupling shaft;
a retainer for supporting the stirring shaft below the cam assembly and in a receiving position;
said method comprising the steps of:
placing the retainer into said container;
placing the stirring the shaft into the retainer such that the stirring shaft is coupled to said retainer;
adding in the food product to be processed into said container;
placing the container at the base of the housing such that the position of the engagement head coincides with the engagement position of the second end of the coupling shaft;

activating the coupling shaft to the engagement position by pressing once on the coupling shaft such that the cam assembly causes locking of the coupling shaft onto the stirring shaft;

switching the motor on such that the food product is stirred and processed.

13. A method according to claim 12 wherein the food product is soybean.

* * * * *